(12) United States Patent
Lee et al.

(10) Patent No.: US 10,800,149 B2
(45) Date of Patent: Oct. 13, 2020

(54) SYSTEM FOR MANUFACTURING DISPLAY UNIT

(71) Applicant: LG CHEM, LTD., Seoul (KR)

(72) Inventors: Beom Seok Lee, Daejeon (KR); Suk Jae Lee, Daejeon (KR); Kyung Hyeok Park, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 45 days.

(21) Appl. No.: 15/605,357

(22) Filed: May 25, 2017

(65) Prior Publication Data

US 2017/0341360 A1  Nov. 30, 2017

(30) Foreign Application Priority Data

May 31, 2016  (KR) .......................... 10-2016-0067659

(51) Int. Cl.
  *B32B 38/04*  (2006.01)
  *G02F 1/13*  (2006.01)
  (Continued)

(52) U.S. Cl.
  CPC .............. *B32B 38/04* (2013.01); *B32B 41/00* (2013.01); *G02F 1/1303* (2013.01);
  (Continued)

(58) Field of Classification Search
  CPC ............. G02F 1/1303; G02F 1/133528; Y10T 156/12; Y10T 156/1304; Y10T 156/1064
  See application file for complete search history.

(56) References Cited

U.S. PATENT DOCUMENTS

| 4,333,790 A * | 6/1982 | Schaffron | ............... B31B 70/00 |
| | | | 156/253 |
| 2010/0163154 A1* | 7/2010 | Masuda | ................ B31F 1/2831 |
| | | | 156/64 |

(Continued)

FOREIGN PATENT DOCUMENTS

KR  10-2014-0024422 A  2/2014

*Primary Examiner* — Mark A Osele
*Assistant Examiner* — Christopher C Caillouet
(74) *Attorney, Agent, or Firm* — Dentons US LLP (57) ABSTRACT

Disclosed is a system for manufacturing a display unit, including: a carrying unit configured to carry an optical film; a cutting unit configured to form a slit line on the optical film from a side opposite to the release film by a predetermined depth, in which the release film is not cut; a peeling unit configured to peel the polarizing film from the release film; and an attaching unit configured to attach the polarizing film peeled from the release film to a panel, in which the carrying unit includes a carrying direction changing unit, which changes a direction in which the optical film is carried so that the optical film carried along a first straight section is carried along a second straight section crossing the first straight section, and when the carrying of the optical film is stopped, the slit line formed on the optical film is positioned in the first straight section or the second straight section among the first straight section, the second straight section, and a curved section positioned between the first straight section and the second straight section.

4 Claims, 6 Drawing Sheets

(51) Int. Cl.
*G02F 1/1335* (2006.01)
*B32B 41/00* (2006.01)
B32B 38/00 (2006.01)
B32B 38/10 (2006.01)

(52) U.S. Cl.
CPC ........... *B32B 38/0004* (2013.01); *B32B 38/10* (2013.01); *B32B 2038/045* (2013.01); *B32B 2309/70* (2013.01); *B32B 2457/20* (2013.01); *G02F 1/133528* (2013.01); *G02F 2202/28* (2013.01)

(56) References Cited

U.S. PATENT DOCUMENTS

| | | | |
|---|---|---|---|
| 2010/0186873 A1* | 7/2010 | Shin | B65H 23/1955 156/64 |
| 2010/0258249 A1* | 10/2010 | Kitada | B29D 11/0074 156/510 |
| 2014/0041798 A1* | 2/2014 | Umemoto | H01L 51/56 156/235 |

* cited by examiner

SYSTEM FOR MANUFACTURING DISPLAY UNIT

This application is a Utility Application which claims priority to and the benefit of Korean Patent Application No. 10-2016-0067659 filed on May 31, 2016, which is hereby incorporated by reference in its entirety herein.

TECHNICAL FIELD

The present invention relates to a system for manufacturing a display unit, and more particularly, to a system for manufacturing a display unit, which minimizes a transformation of a carried optical film when a display unit is manufactured.

BACKGROUND ART

A display unit including a liquid crystal display (LCD), an organic light emitting diode (OLED), a plasma display panel (PDP), and an electrophoretic display (EPD) is manufactured through several processes. In order to manufacture the display unit, an optical film is attached onto one surface and the other surface of a panel, and when an absorption axis of the optical film attached onto one surface of the panel is vertical to an absorption axis of the optical film attached onto the other surface of the panel, the panel is normally operated. A process of attaching the optical film to the one surface of the panel will be described below.

Figure 1:
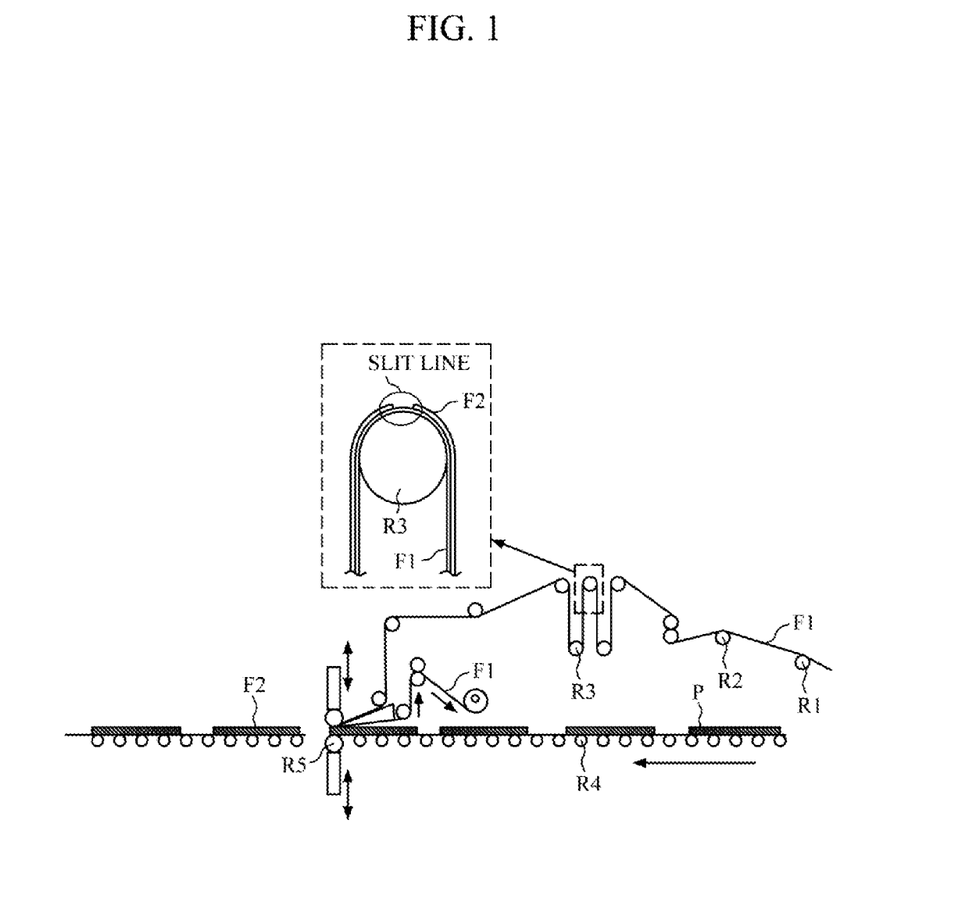
FIG. 1 is a diagram illustrating an example of a process of attaching an optical film onto one surface of a panel.

FIG. 1 is a diagram illustrating an example of a process of attaching an optical film onto one surface of a panel.

Referring to FIG. 1, in a process of attaching an optical film onto one surface of a panel, a supply roller R1 supplying an optical film F having a width corresponding to a short side of a panel P supplies the optical film F, and the supplied optical film F is shifted to an attachment position, at which the optical film F is attached onto the panel P, by a carrying roller R2. Before the optical film F is attached onto the panel P, a slit line (hereinafter, a half-cut) is formed on the optical film F by a predetermined depth, with which a release film F1 is not cut. In order to decrease a space, in which the optical film F is carried, a change roller R3 changing a carrying direction of the optical film F may be installed. The panel P is attached to the attachment position by a shifting roller R4, and when the optical film F and the panel P are shifted to the attachment position, a pair of attachment rollers R5 attaches the optical film F to the panel P.

When the optical film is replaced, a display unit manufacturing apparatus has a failure, or a problem is generated in the carried optical film or the manufactured display unit during a process of manufacturing the display unit by attaching the optical film F to the panel P, the carrying of the optical film F may be stopped by a mistake of an operator, a change in a model of a display unit desired to be manufactured, and the like. As can be seen in FIG. 1, when the carrying of the optical film F is stopped, the slit line formed on the optical film F may be positioned in a section, in which the carrying direction of the optical film F is changed.

When a predetermined time elapses in the state where the slit line is positioned in the section, a polarizing film on the optical film may be peeled from a release film, foreign substances may be introduced into an adhesive layer of the polarizing film peeled from the release film, or a part of the release film may be torn or split, so that the optical film may be transformed.

Accordingly, in order to prevent the optical film from being transformed, there is a demand for a system for manufacturing a display unit, which prevents a slit line formed on the optical film from being positioned in a section, in which a carrying direction of an optical film is changed, when the carrying of the optical film is stopped.

SUMMARY OF THE INVENTION

The present invention has been made in an effort to provide a system for manufacturing a display unit, which minimizes a transformation of a carried optical film when a display unit is manufactured.

An exemplary embodiment of the present invention provides a system for manufacturing a display unit, including: a carrying unit configured to carry an optical film having a polarizing film including an adhesive layer and a release film attached to the adhesive layer so as to be peeled off; a cutting unit configured to form a slit line on the optical film from a side opposite to the release film by a predetermined depth, in which the release film is not cut; a peeling unit configured to peel the polarizing film from the release film; and an attaching unit configured to attach the polarizing film peeled from the release film to a panel, in which the carrying unit includes a carrying direction changing unit, which changes a direction in which the optical film is carried so that the optical film carried along a first straight section is carried along a second straight section crossing the first straight section, and when the carrying of the optical film is stopped, the slit line formed on the optical film is positioned in the first straight section or the second straight section among the first straight section, the second straight section, and a curved section positioned between the first straight section and the second straight section.

The carrying direction changing unit may include a position changing unit, which changes a position of the carrying direction changing unit.

The position changing unit may shift the carrying direction changing unit in at least one of the vertical direction and the horizontal direction.

The carrying direction changing unit may change the carrying direction of the optical film by 90° or more.

The carrying direction changing unit may include a peeling preventing unit, which prevents the polarizing film from being peeled from the release film.

Another exemplary embodiment of the present invention provides a system for manufacturing a display unit, including: a carrying unit configured to carry along a carrying line in a vent of curved shape a polarizing film having an adhesive layer and a release film attached to the adhesive layer so as to be peeled off; a cutting unit configured to form a slit line on the optical film from a side opposite to the release film by a predetermined depth, in which the release film is not cut; a peeling unit configured to peel the polarizing film from the release film; and an attaching unit configured to attach the polarizing film peeled from the release film to a panel, in which when the carrying of the optical film is stopped, the slit line formed on the optical film is not positioned at least a part of a section, in which the carrying line is bent or curved.

The system may further include a position changing unit configured to change a position, at which the carrying line is bent or curved.

The position changing unit may shift the position, at which the carrying line is bent or curved, in at least one of a vertical direction and a horizontal direction.

In a section, in which the carrying line is bent or curved, the carrying direction of the optical film may be changed by 90° or more.

The system may further include a peeling preventing unit, which is formed in a section, in which the carrying line is bent or curved, and prevents the polarizing film from being peeled from the release film.

According to exemplary embodiments of the present invention, it is possible to minimize a transformation of an optical film carried to the system for manufacturing the display unit by the carrying unit.

DETAILED DESCRIPTION

Hereinafter, the exemplary embodiments of the present invention will be described more fully with reference to the accompanying drawings so that those skilled in the art can easily carry out the present invention. However, the present invention may be modified in various different forms, are not limited to the exemplary embodiments described herein. A part irrelevant to the description will be omitted in the drawings to clearly describe the present invention, and the same elements will be designated by the same reference numerals throughout the specification.

Terms used in the present specification will be briefly described, and the present invention will be described in detail.

As the terms used in the present invention, general terms, which are currently and widely used in consideration of a function in the present invention, have been selected, but may be changed according to the intentions of those skilled in the art or judicial precedents, appearance of new technology, or the like. Further, in a specific case, there is a term randomly selected by an applicant, and in this case, a meaning of the term will be described in detail in the corresponding description of the invention. Accordingly, the terms used in the present invention shall be defined based on the meaning of the term and the contents throughout the present invention, not the simple name of the term.

Throughout the specification, unless explicitly described to the contrary, the word "comprise" and variations such as "comprises" or "comprising", will be understood to imply the inclusion of stated elements but not the exclusion of any other elements.

Hereinafter, the present invention will be described in detail with reference to the accompanying drawing.

Figure 2:
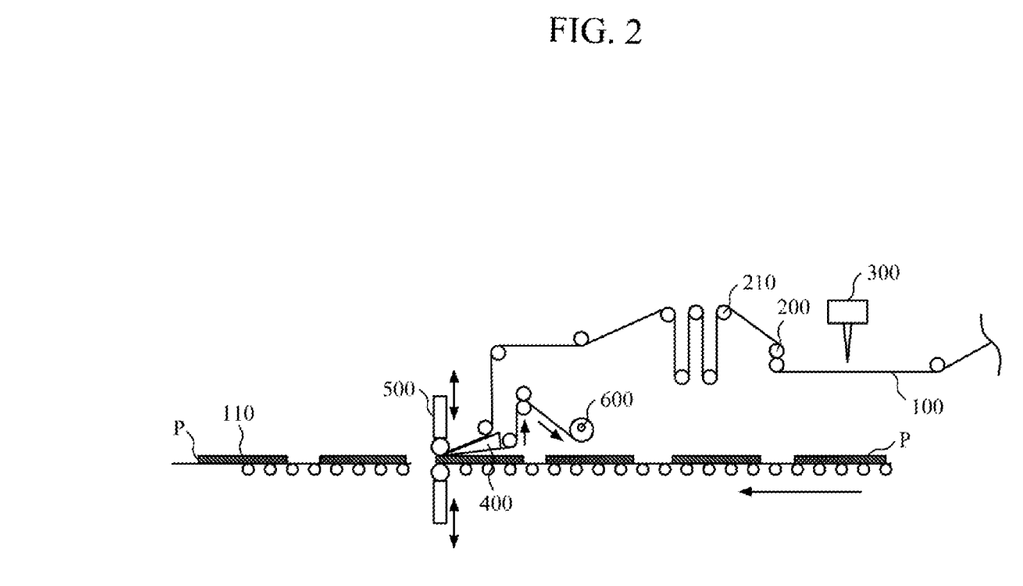
FIG. 2 is a diagram illustrating a process of attaching an optical film to one surface of a panel according to an exemplary embodiment of the present invention.

FIG. 2 is a diagram illustrating a process of attaching an optical film to one surface of a panel according to an exemplary embodiment of the present invention.

A system for manufacturing a display unit according to an exemplary embodiment of the present invention includes a carrying unit 200 carrying an optical film 100 including a polarizing film 110 including an adhesive layer and a release film 120 attached to the adhesive layer so as to be peeled off, a cutting unit 300 forming a slit line on the optical film 100 from a side opposite to the release film 120 by a predetermined depth, in which the release film 120 is not cut, a peeling unit 400 peeling the polarizing film 110 from the release film 120, and an attaching unit 500 attaching the polarizing film 110 peeled from the release film 120 to a panel P, and the carrying unit 200 includes a carrying direction changing unit 210, which changes a carrying direction of the optical film 100 so that the optical film 100 carried along a first straight section may be carried along a second straight section crossing the first straight section, and when the carrying of the optical film 100 is stopped, the slit line formed on the optical film 100 is positioned in the first straight section or the second straight section among the first straight section, the second straight section, and a curved section positioned between the first straight section and the second straight section.

The system for manufacturing the display unit according to the exemplary embodiment of the present invention prevents the slit line formed on the optical film 100 from being positioned in the section, that is, the curved section positioned between the first straight section and the second straight section, in which the carrying direction of the optical film 100 is changed, when the carrying of the optical film 100 is stopped, thereby minimizing a transformation of the optical film 100 generable in the section, in which the carrying direction is changed.

The system for manufacturing the display unit according to the exemplary embodiment of the present invention may, for example, attach the polarizing film 110 to one surface of the panel P at a lower side of the panel P and attach the polarizing film 110 to the other surface of the panel P at the lower side of the panel P by reversing the panel P, and attach the polarizing film 110 to one surface of the panel P at an upper side of the panel P and attach the polarizing film 110 to the other surface of the panel P at the upper side of the panel P by reversing the panel P. Further, the system for manufacturing the display unit according to the exemplary embodiment of the present invention may attach the polarizing film 110 to one surface of the panel P at the upper side of the panel P and attach the polarizing film 110 to the other surface of the panel P at the lower side of the panel P without reversing the panel P, and attach the polarizing film 110 to one surface of the panel P at the lower side of the panel P and attach the polarizing film 110 to the other surface of the panel P at the upper side of the panel P without reversing the panel P.

The processes of attaching the polarizing film 110 to the one surface and the other surface of the panel P may be the same, so that for convenience of the description, the present invention will be described in detail based on the process of attaching the polarizing film 110 to the one surface of the panel P hereinafter.

The optical film 100 used in the system for manufacturing the display unit according to the exemplary embodiment of the present invention includes the polarizing film 110, and may further include a film having an optical characteristic, such as a phase difference film, a viewing angle compensating film, and a luminance improving film, in addition to the polarizing film 110. That is, the optical film 100, in which a film having an optical characteristic is attached to one surface or both surfaces of the polarizing film 110, may be used. A protective transparent film may be attached to the polarizing film 110 and the film having the optical characteristic so as to protect the surfaces of the polarizing film 110 and the film. For example, a triacetyl cellulose film and a polyethylenephthalate film may be used as the protective transparent film. An adhesive layer attachable to the panel P may be formed on one surface of the polarizing film 110, and the release film 120 for protecting the adhesive layer may be attached to the adhesive layer. The adhesive layer may be formed of, for example, an acryl-based adhesive, a silicon-based adhesive, or a urethane-based adhesive, and may have a thickness of 10 to 50 μm. For example, a polyethylene terephthalate-based film and a polyolefin-based film may be used as the release film 120.

Further, the optical film 100 used in the system for manufacturing the display unit may use the optical film 100 wound in a roll type. For example, the optical film 100 obtained by attaching the plurality of polarizing films 110 formed in a size corresponding to the panel P to the long release film 120 through the adhesive layers and winding the polarizing films 110 and the release film 120 in a roll type may be used as the roll-type optical film 100. That is, the optical film 100 may be the continuous rolls of the polarizing film 110, on which the slit line is formed. When the roll-type optical film 100 is used, an operation of cutting the optical film 100 by the system for manufacturing the display unit may be omitted.

The panel P attached with the polarizing film 110 includes a liquid crystal cell, and the panel P may be classified into a vertical alignment (VA) type, an in-plane switching (IPS) type, and the like.

The carrying unit 200 carries the optical film 100 including the polarizing film 110 including the adhesive layer and the release film 120 adhering to the adhesive layer so as to be peeled off to a downstream side of the system for manufacturing the display unit of the present invention. For example, the carrying unit 200 may carry the optical film 100, which is attached to one surface of the panel P and has a width corresponding to a length of a short side of the panel P, or the optical film 100, which is attached to the other surface of the panel P and has a width corresponding to a length of a long side of the panel P.

The carrying unit 200 may include various transferring means which are capable of carrying the optical film 100. For example, the carrying unit 200 may carry the optical film 100 by using a conveyor belt or a roller.

The carried optical film 100 may go through an examination process before the slit line is formed by the cutting unit 300. In the examination process, light may be emitted to the optical film 100 by using a light source, an image of transmissive light or reflective light emitted from the optical film 100 in the emitted light may be photographed, and the image may be processed to examine a defect on the optical film 100. For example, a method of detecting a defect through a light and shade determination by binarization processing may be used as the image processing method. Further, as the method of examining the defect, for example, a method of examining a defect of the optical film 100 by discriminating strength and weakness or a change in a wavelength of transmissive light or reflective light may be used. A position of the slit line formed on the optical film 100 may be determined by using location information of the defect calculated by the examination process.

The cutting unit 300 according to the exemplary embodiment of the present invention forms the slit line on the optical film 100 from a side opposite to the release film 120 by a predetermined depth, in which the release film 120 is not cut. The cutting unit 300 cuts the polarizing film 110 and the adhesive layer with a predetermined size without cutting the release film 120. That is, the cutting unit 300 may sequentially form the slit line on the optical film 100 in a size corresponding to the panel P. For example, the cutting unit 300 may sequentially form the slit lines on the optical film 100, which is attached to one surface of the panel P and has the width corresponding to the length of the short side of the panel P, by an interval corresponding to the length of the long side of the panel P, and may sequentially form the slit lines on the optical film 100, which is attached to the other surface of the panel P and has the width corresponding to the length of the long side of the panel P, by an interval corresponding to the length of the short side of the panel P.

By using the location information of the defect of the optical film 100 calculated in the examination process, the cutting unit 300 may form the slit line on the optical film 100 so that the defect is not included in the polarizing film 110 attached to the panel P. The part of the polarizing film 110 including the defect may be excluded by an excluding unit (not illustrated) so as not to be attached to the panel P. The polarizing film 110 including the defect is not attached to the panel P and is excluded, so that it is possible to improve yield of the display unit.

The cutting unit 300 may include various cutting means which are capable of cutting the optical film 100. For example, a laser unit and a cutter may be used as the cutting unit 300.

The peeling unit 400 peels the optical film 100 from the release film 120. The peeling unit 400 folds back the release film 120 in the optical film 100 carried by the carrying unit 200 toward the inner side and peels the polarizing film 110 and the adhesive layer from the release film 120. For example, a knife edge portion may be formed at a leading end of the peeling unit 400, and a curvature radius of the knife edge portion may be 0.3 to 5.0 mm. The carrying direction of the release film 120 in the carried optical film 100 is changed at the leading end of the peeling unit 400, so that the release film 120 may be peeled from the polarizing film 110. The release film 120 peeled by the peeling unit 400 is wound by a winding unit 600.

The attaching unit 500 attaches the polarizing film 110 peeled from the release film 120 to the one surface of the panel P. The attaching unit 500 may include a pair of attaching rolls. The pair of attaching rolls may be formed to move up and down in a vertical direction, and may be rotated by a motor. For example, a rubber roller or a metal roller may be used as the pair of attaching rolls.

The polarizing film 110 may be attached to the one surface of the panel P by positioning the polarizing film 110 and the panel P carried to the attaching unit 500 between the pair of attaching rolls and compressing the pair of attaching rolls. In order to prevent bubbles from being generated between the polarizing film 110 and the panel P during the attachment of the polarizing film 110, it is preferable to attach the polarizing film 110 and the panel P while maintaining flatness.

The system for manufacturing the display unit according to the exemplary embodiment of the present invention may be formed in a state of being isolated from the outside. An isolation structure is formed by using a wall and a framework formed of a transparent material, so that an internal side of the isolation structure may maintain a cleaner state than that of an external side. A blowing device may be installed on the wall of the isolation structure to blow air having high cleanliness into a partition wall structure and discharge air inside the partition wall structure to the outside. Accordingly, the display unit is manufactured in the state of being isolated from the outside, thereby decreasing a defect of the display unit by an inflow of foreign substances.

The driving of the carrying unit 200, the cutting unit 300, the peeling unit 400, and the attaching unit 500 may be controlled by a control unit (not illustrated). The control unit is linked with the carrying unit 200, the cutting unit 300, the peeling unit 400, and the attaching unit 500 to control the carrying unit 200, the cutting unit 300, the peeling unit 400, and the attaching unit 500, so that it is possible to continuously manufacture the display unit.

Figure 3:
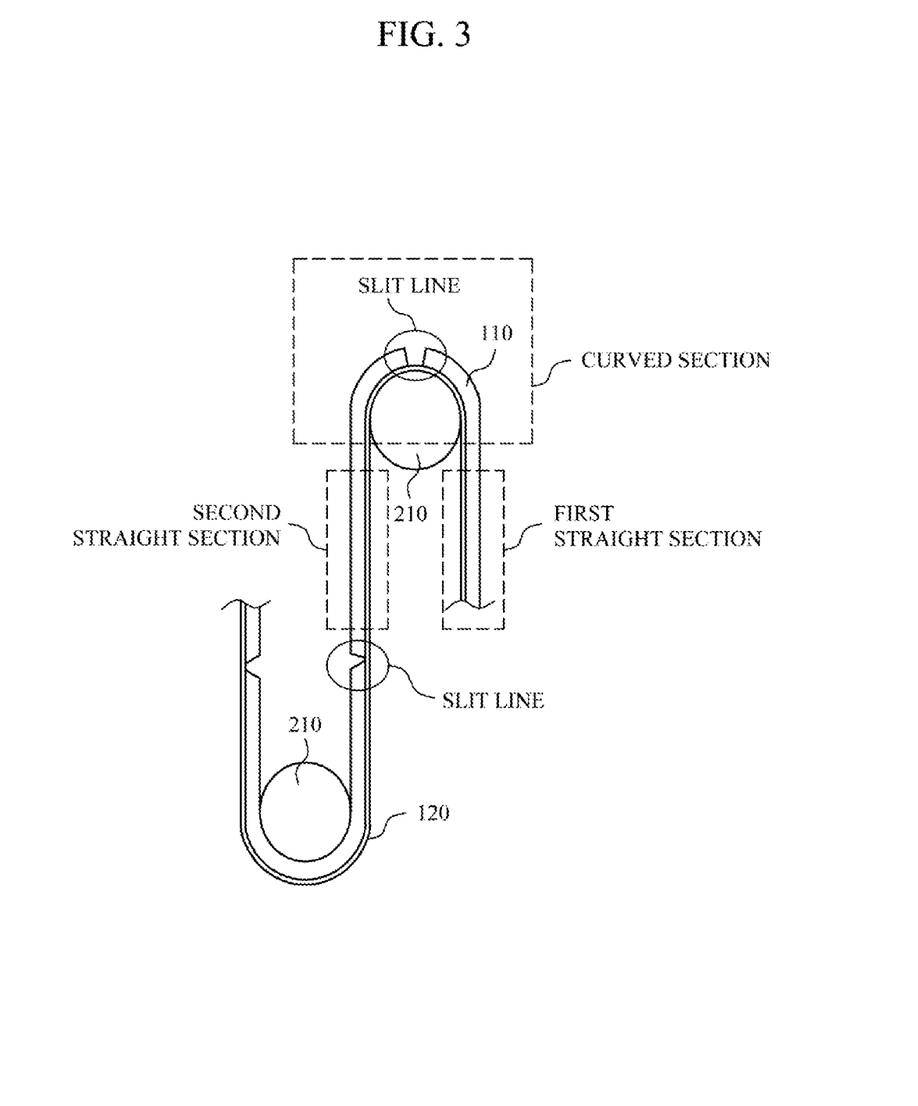
FIG. 3 is a diagram illustrating a carrying direction changing unit according to the exemplary embodiment of the present invention.

FIG. 3 is a diagram illustrating the carrying direction changing unit according to the exemplary embodiment of the present invention.

The carrying unit 200 includes the carrying direction changing unit 210 changing the carrying direction of the optical film 100. The carrying direction changing unit 210 changes the carrying direction of the optical film 100 so that the optical film 100 carried along the first straight section may be carried along the second straight section crossing the first straight section. As can be seen in FIG. 3, the optical film 100 is carried in the first straight section positioned at an upstream side of the system for manufacturing the display unit, and the optical film 100 carried along the first straight section changes the carrying direction while passing through the curved section. The optical film 100 passing through the curved section is carried to the second straight section which crosses the first straight section and is positioned at a lower side than the first straight section.

Referring to FIG. 3, the carrying direction changing unit 210 may include a unit, which is positioned at a side of the release film 120 of the carried optical film 100 and changes the carrying direction of the optical film 100 while having the release film 120 at an inner side, and a unit, which is positioned at a side of the polarizing film 110 of the carried optical film 100 and changes the carrying direction of the optical film 100 while having the polarizing film 110 at an inner side. Further, the carrying unit 200 may include the plurality of carrying direction changing units 210, and the carrying direction changing unit 210 may change the carrying direction of the optical film 100 by 90° or more. That is, the system for manufacturing the display unit may include the plurality of first straight sections and second straight sections, in which the optical film 100 is carried in a shape of a straight line, and the plurality of curved sections, which is positioned between the first straight section and the second straight section, and in which the optical film 100 is carried in a shape of a curved line.

For example, the carrying direction changing unit 210 having an external diameter larger than that of the carrying unit 200, which does not change the carrying direction of the optical film 100, by about 1.5 times to 2 times may be used. When the carrying direction of the optical film 100 is changed in the carrying direction changing unit 210 having the larger external diameter, the carrying direction of the carried optical film 100 may be changed in a more curved form.

For example, when the carrying unit 200, the cutting unit 300, the peeling unit 400, and the attaching unit 500 configuring the system for manufacturing the display unit are checked, a display unit manufacturing device has a failure, and the carried optical film or the manufactured display unit has a problem during the process of manufacturing the display unit, the carrying of the optical film 100 may be stopped by a mistake of an operator and the like.

When the carrying of the optical film 100 is stopped in the state where the slit line formed on the optical film 100 is positioned in the curved section, in which the carrying direction of the optical film 100 is changed, the polarizing film 110 is peeled from the release film 120, foreign substances are introduced into the adhesive layer of the polarizing film 110 peeled from the release film 120, or a part of the release film 120 is torn or split, so that the optical film 100 may be transformed.

According to the exemplary embodiment of the present invention, when the carrying of the optical film 100 is stopped, the slit line formed on the optical film 100 is positioned in the first straight section or the second straight section among the sections, in which the optical film 100 is carried, thereby minimizing a transformation of the optical film 100 carried to the downstream side of the system for manufacturing the display unit.

Figure 4A:
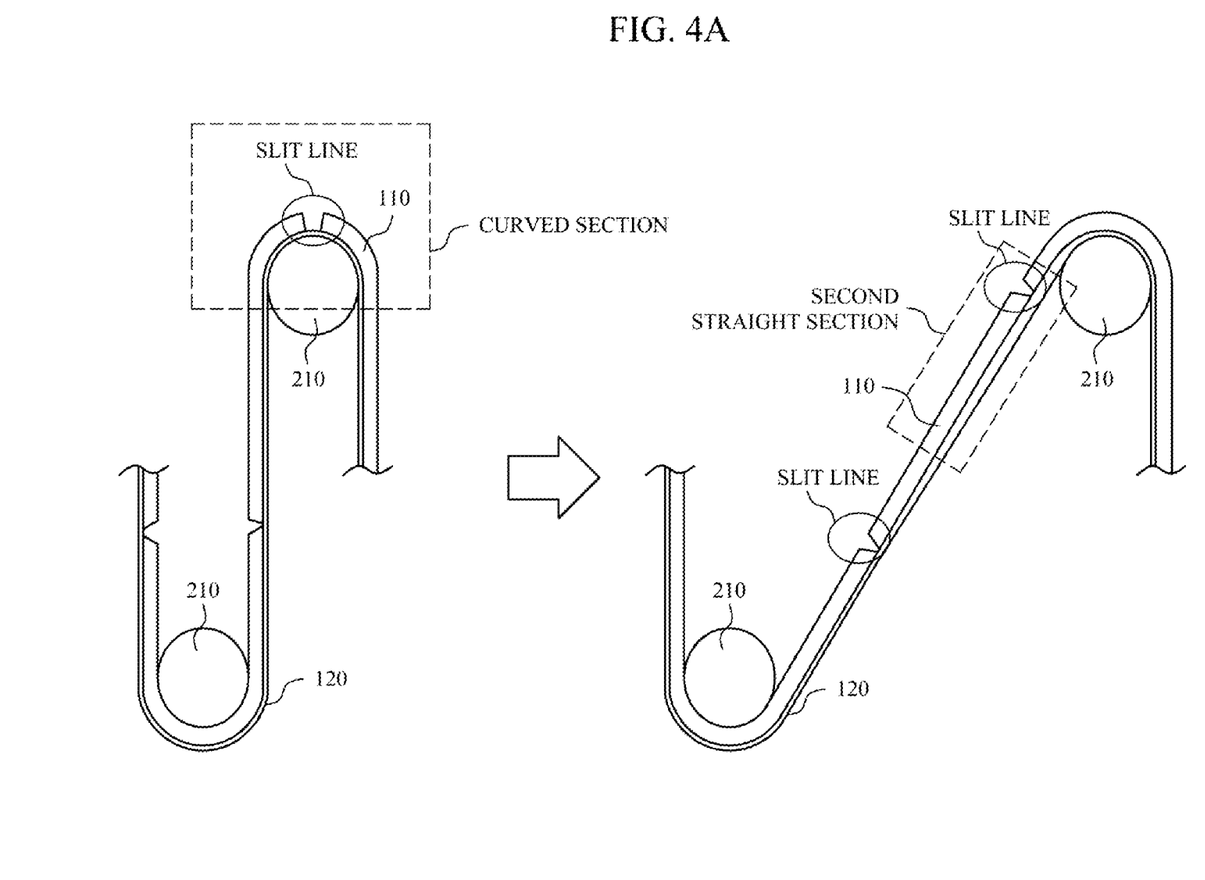
FIGS. 4A and 4B are diagrams illustrating a change in a position of the carrying direction changing unit according to the exemplary embodiment of the present invention.
Figure 4B:
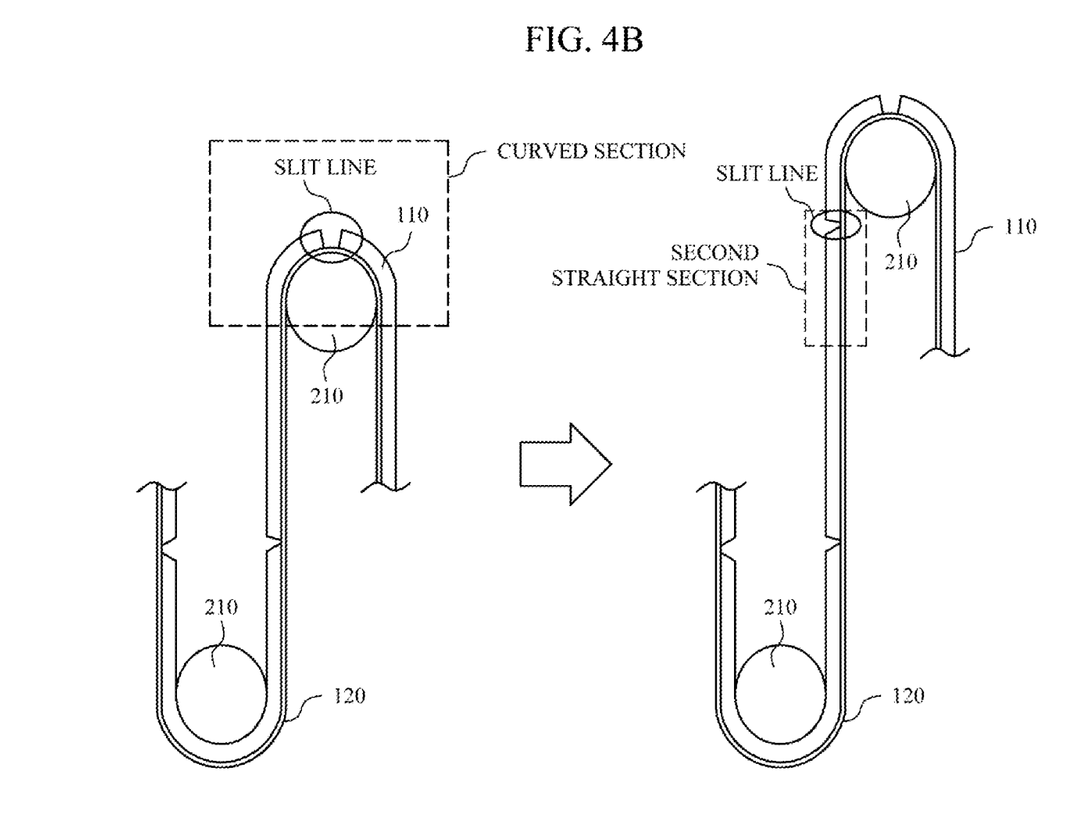

FIGS. 4A and 4B are diagrams illustrating a change in a position of the carrying direction changing unit according to the exemplary embodiment of the present invention.

The carrying direction changing unit 210 according to the exemplary embodiment of the present invention may include a position changing unit (not illustrated) changing a position of the carrying direction changing unit 210. Referring to FIGS. 4A and 4B, the position changing unit may change a position of the carrying direction changing unit 210 so that the slit line formed on the optical film 100 is not positioned in the section, that is, the curved section, in which the carrying direction of the optical film 100 is changed, when the carrying of the optical film 100 is stopped.

When the carrying of the optical film 100 is stopped in the state where the slit line formed on the optical film 100 is positioned in the curved section, in which the carrying direction of the optical film 100 is changed, the position changing unit changes the position of the carrying direction changing unit 210 to prevent the slit line from being positioned in the curved section, in which the carrying direction of the optical film 100 is changed.

The position changing unit may adjust the position of the carrying direction changing unit 210, which is positioned at the side of the release film 120 of the carried optical film 100 and changes the carrying direction of the optical film 100 while having the release film 120 at the inner side.

Referring to FIG. 3, when the carrying of the optical film 100 is stopped, the peeling of the polarizing film 110 from the release film 120 and the transformation of the optical film 100 may be more easily generated when the slit line formed on the optical film 100 is positioned in the carrying direction changing unit 210 positioned at the side of the release film 120, compared to the case where the slit line formed on the optical film 100 is positioned in the carrying direction changing unit 210 positioned at the side of the polarizing film 110. When the slit line formed on the optical film 100 is positioned in the carrying direction changing unit 210, which is positioned at the side of the polarizing film 110 and changes the carrying direction of the optical film 100 while having the polarizing film 110 at the inner side, the polarizing film 110 may be pressed toward the release film 120, so that the peeling of the polarizing film 110 from the release film 120 may be suppressed. Accordingly, when the carrying of the optical film 100 is stopped in the state where the slit line formed on the optical film 100 is positioned in the carrying direction changing unit 210 positioned at the side of the release film 120, the position changing unit may change the position of the carrying direction changing unit 210.

The carrying unit 200 may include a tension maintaining means (not illustrated). The tension maintaining means may include a pair of tension maintaining rollers. For example, when the position changing unit changes the position of the carrying direction changing unit 210, the tension maintaining roller is driven while rotating in a clockwise direction or a counterclockwise direction to unwind or pull the optical film, so that it is possible to maintain tension of the carried optical film 100.

The position changing unit according to the exemplary embodiment of the present invention may shift the carrying direction changing unit 210 in at least one of the vertical direction and the horizontal direction. That is, the position changing unit may shift the carrying direction changing unit 210 in the vertical direction with respect to the ground, shift the carrying direction changing unit 210 in the horizontal direction with respect to the ground, and shift the carrying direction changing unit 210 in the vertical direction and the horizontal direction with respect to the ground.

The position changing unit may include, for example, a connecting unit connected with a rotation shaft of the roll-type carrying direction changing unit 210, a driving unit shifting the position changing unit, and a control unit controlling the driving unit. Further, the driving unit may be formed of a motor and a roller rotated by the motor, and the roller of the driving unit may be shifted along a guide unit, in which a shift line is formed. For example, when the slit line formed on the optical film 100 is positioned in the curved section, in which the carrying direction of the optical film 100 is changed, when the carrying of the optical film 100 is stopped, the control unit controls the motor of the driving unit so that the roller is shiftable along the shift line of the guide unit to shift the carrying direction changing unit 210 to a position spaced apart from an original position by a predetermined interval.

Figure 5:
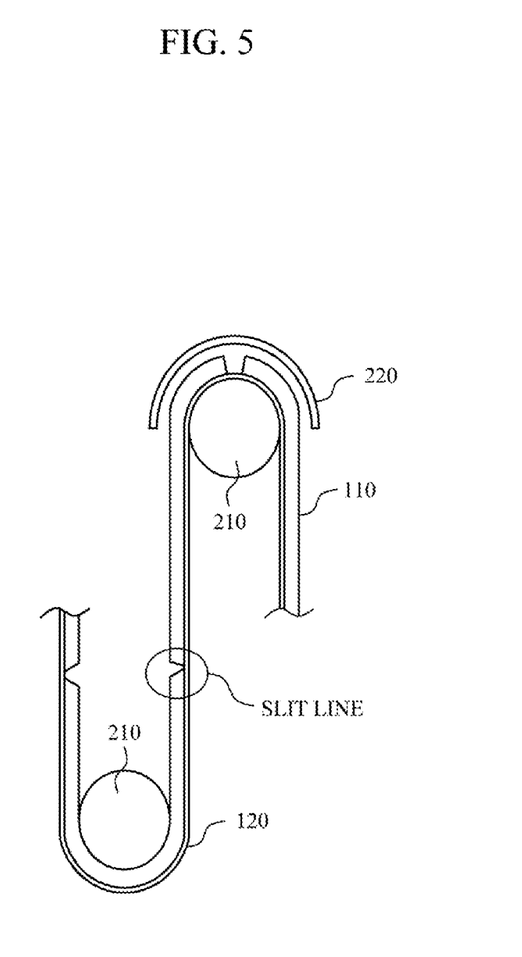
FIG. 5 is a diagram illustrating a peeling preventing unit formed in the carrying direction changing unit according to the exemplary embodiment of the present invention.

FIG. 6 is a diagram illustrating a peeling preventing unit formed in the carrying direction changing unit according to the exemplary embodiment of the present invention.

The carrying direction changing unit 210 according to the exemplary embodiment of the present invention may include a peeling preventing unit 220 preventing the polarizing film 110 from being peeled from the release film 120.

At the position, at which the carrying direction of the optical film 100 is changed by the carrying direction changing unit 210, the peeling preventing unit 220 may be formed at a position spaced by an interval corresponding to a thickness or more of the carried optical film 100 at a site opposite to the carrying direction changing unit 210 with the optical film 100 interposed therebetween. The peeling preventing unit 220 may prevent the polarizing film 110 from being peeled from the release film 120 at the position, at which the carrying direction of the optical film 100 is changed.

The peeling preventing unit 220 may be formed in the carrying direction changing unit 210, which is positioned at the side of the release film 120 of the carried optical film 100 and changes the carrying direction of the optical film 100 while having the release film 120 at the inner side. When the carrying direction of the carried optical film 100 is changed in the carrying direction changing unit 210 positioned at the side of the release film 120, the polarizing film 110 may be more easily peeled from the release film 120, compared to the case where the carrying direction of the carried optical film 100 is changed in the carrying direction changing unit 210 positioned at the side of the polarizing film 110.

Accordingly, according to the exemplary embodiment of the present invention, when the carrying of the optical film 100 is stopped in the section, in which the carrying direction of the optical film 100 is changed, it is possible to easily prevent the polarizing film 110 from being peeled from the release film 120.

A position of the peeling preventing unit 220 may be changed together with the carrying direction changing unit 210 by the position changing unit.

Both ends of the peeling preventing unit 220 may be formed to be curved to the outside. Both ends of the peeling preventing unit 220 are formed to be curved to the outside, so that even when the polarizing film 110 is peeled from the release film 120 before the optical film 100 is carried to the carrying direction changing unit 210, in which the peeling preventing unit 220 is formed, the end of the peeled polarizing film 110 may be easily carried between the peeling preventing unit 220 and the carrying direction changing unit 210.

The peeling preventing unit may be formed in a form including a plurality of rolls. The plurality of rolls may be formed at a position spaced by an interval corresponding to the thickness or more of the carried optical film 100 at the side opposite to the carrying direction changing unit 210. The plurality of rolls is disposed in a form corresponding to a shape of the carrying direction changing unit 210 to easily prevent the polarizing film 110 from being peeled from the release film 120 in the section, in which the carrying direction of the optical film 100 is changed. The plurality of rolls is rotatable, and may also autonomously rotate by a motor and the like.

The peeling preventing unit 220 including an air injecting unit may be formed in the section, in which the carrying direction of the optical film 100 is changed. The air injecting unit is formed in a form corresponding to a shape of the carrying direction changing unit 210, and the air injecting unit injects air to the optical film carried along the carrying unit 200 with high pressure, thereby easily preventing the polarizing film 110 from being peeled from the release film 120.

A system for manufacturing a display unit according to another exemplary embodiment of the present invention includes a carrying unit 200, which carries a polarizing film 110 including an adhesive layer and a release film 120 attached to the adhesive layer so as to be peeled off along a carrying line having a bent or curved shape, a cutting unit 300 forming a slit line on the optical film 100 from a side opposite to the release film 120 by a predetermined depth, in which the release film 120 is not cut, a peeling unit 400 peeling the polarizing film 110 from the release film 120, and an attaching unit 500 attaching the polarizing film 110 peeled from the release film 120 to a panel P, and when the carrying of the optical film 100 is stopped, the slit line formed on the optical film 100 is not positioned in at least a part of a section, in which the carrying line is bent or curved.

The carrying line may have a plurality of bent or curved sections. The plurality of carrying units 200 formed in the carrying line is not positioned in one straight line, but is disposed according to a position of each unit configuring the system for manufacturing the display unit, so that a section, in which a carrying path is bent or curved, may be formed along an outer peripheral surface of the carrying unit 200. A carrying direction of the optical film 100 is changed in the section, in which the carrying line is bent or curved. In the section, in which the carrying line is bent or curved, the carrying direction of the optical film 100 may be changed by 90° or more.

For example, when the units configuring the system for manufacturing the display unit are checked, a display unit manufacturing device has a failure, and the carried optical film or the manufactured display unit has a problem during the process of manufacturing the display unit, the carrying of the optical film 100 may be stopped by a mistake of an operator and the like. When the carrying of the optical film 100 is stopped in the state where the slit line formed on the optical film 100 is positioned in the section, in which the carrying line is bent or curved, and a predetermined time elapses, the polarizing film 110 is peeled from the release film 120, foreign substances are introduced into the adhesive layer of the polarizing film 110 peeled from the release film 120, or a part of the release film 120 is torn or split, so that the optical film 100 may be transformed.

Accordingly, the system for manufacturing the display unit according to another exemplary embodiment of the present invention prevents the slit line formed on the optical film 100 from being positioned in the section, in which the carrying line is bent or curved, when the carrying of the optical film 100 is stopped, thereby minimizing a transformation of the optical film 100 generable in the section, in which the carrying line of the optical film 100 is changed.

The system for manufacturing the display unit according to another exemplary embodiment of the present invention may further include a position changing unit (not illustrated) changing a position, at which the carrying line is bent or curved.

For example, the position changing unit may shift the carrying unit 200 positioned in the section, in which the carrying line is bent or curved, thereby changing a position, at which the carrying line is bent or curved. The carrying unit 200 may include a shifting roller (not illustrated). When the position changing unit changes the position of the carrying unit 200, the shifting roller is shifted, thereby maintaining tension of the carried optical film 100.

When the carrying of the optical film 100 is stopped in the state where the slit line formed on the optical film 100 is positioned in the section, in which the carrying line is bent or curved, the position changing unit changes the position of the carrying unit 200, thereby preventing the slit line from being positioned in the section, in which the carrying line is bent or curved.

The position changing unit according to another exemplary embodiment of the present invention may shift the position, at which the carrying line is bent or curved, in at least one of a vertical direction and a horizontal direction.

For example, the position changing unit may shift the carrying unit 200 positioned in the section, in which the carrying line is bent or curved, in the vertical direction with respect to the ground, shift the carrying unit 200 in the horizontal direction with respect to the ground, and shift the carrying unit 200 in the vertical direction and the horizontal direction with respect to the ground. Accordingly, the position, at which the carrying line is bent or curved, may be shifted in at least one of the vertical direction and the horizontal direction.

The system for manufacturing the display unit according to another exemplary embodiment of the present invention may further include a peeling preventing unit 220, which is formed in the section, in which the carrying line is bent or curved, and prevents the polarizing film 110 from being peeled from the release film 120.

In the section, in which the carrying line is bent or curved, the peeling preventing unit 220 may be formed at a position spaced by an interval corresponding to a thickness or more of the carried optical film 100 at a side opposite to the carrying unit 200 with the optical film 100 interposed therebetween.

The peeling preventing unit 220 may be formed in a form corresponding to a shape of the bent or curved carrying line, and both ends of the peeling preventing unit 220 may be formed in a curved form.

The peeling preventing unit 220 may be formed in a form including a plurality of rolls, and may include an air injecting unit.

The above description of the present invention is illustrative, and those skilled in the art to which the present invention pertains may understand that modifications to other particular forms may be easily made without changing the technical spirit or the essential feature of the present invention. Thus, it is to be appreciated that the embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A system for manufacturing a display unit, comprising:
a carrying unit configured to carry an optical film including a polarizing film having an adhesive layer and a release film attached to the adhesive layer so as to be peeled off;
a cutting unit configured to form a slit line on the optical film from a side opposite to the release film by a predetermined depth, in which the release film is not cut;
a peeling unit configured to peel the polarizing film from the release film; and
an attaching unit configured to attach the polarizing film peeled from the release film to a panel,
wherein the carrying unit includes a carrying direction changing unit, which changes a direction in which the optical film is carried so that the optical film carried along a first straight section is carried along a second straight section crossing the first straight section,
wherein the carrying direction changing unit includes a peeling preventing unit, which prevents the polarizing film from being peeled from the release film,
wherein the system for manufacturing a display unit further includes a position changing unit, which changes a position of the carrying direction changing unit so that the slit line formed on the optical film is positioned in the first straight section or the second straight section when the carrying the optical film is stopped in a state where the slit line is positioned in a curved section positioned between the first straight section and the second straight section among the first straight section, the second straight section, and the curved section,
wherein the position changing unit shifts the carrying direction changing unit in the horizontal direction with respect to the ground and changes the direction in which the optical film is carried along the second straight section to the diagonal direction with respect to the ground, and
wherein the peeling unit includes a knife edge portion formed at a leading end of the peeling unit, and a curvature radius of the knife edge portion is 0.3 to 5.0 mm.

2. The system of claim 1, wherein the carrying direction changing unit changes the carrying direction of the optical film by 90° or more.

3. A system for manufacturing a display unit, comprising:
a carrying unit configured to carry along a carrying line in a bent or curved shape an optical film including a polarizing film having an adhesive layer and a release film attached to the adhesive layer so as to be peeled off;
a cutting unit configured to form a slit line on the optical film from a side opposite to the release film by a predetermined depth, in which the release film is not cut;
a peeling preventing unit, which is formed in a section in which the carrying line is bent or curved, and prevents the polarizing film from being peeled from the release film,
a peeling unit configured to peel the polarizing film from the release film; and
an attaching unit configured to attach the polarizing film peeled from the release film to a panel,
wherein the system for manufacturing a display unit further includes a position changing unit, when the carrying of the optical film is stopped in a state where the slit line formed on the optical film is positioned in a section in which the carrying line is bent or curved, the position changing unit changes a position of the section in which the carrying line is bent or curved, so that the slit line is not positioned in the above-said section,
wherein the position changing unit shifts the carrying direction changing unit in the horizontal direction with respect to the ground and changes the direction in which the optical film is carried along the second straight section to the diagonal direction with respect to the ground, and
wherein the peeling unit includes a knife edge portion formed at a leading end of the peeling unit, and a curvature radius of the knife edge portion is 0.3 to 5.0 mm.

4. The system of claim 3, wherein in a section, in which the carrying line is bent or curved, the carrying direction of the optical film is changed by 90° or more.

* * * * *